US011947298B2

(12) United States Patent
Ogata et al.

(10) Patent No.: US 11,947,298 B2
(45) Date of Patent: Apr. 2, 2024

(54) RECORDING MATERIAL CONVEYING DEVICE AND IMAGE FORMING SYSTEM

(71) Applicant: Konica Minolta, Inc., Tokyo (JP)

(72) Inventors: Satoshi Ogata, Hachioji (JP); Atsushi Yamaguchi, Minamiashigara (JP); Kenji Yamamoto, Hachioji (JP); Takashi Nara, Kawagoe (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/983,139

(22) Filed: Nov. 8, 2022

(65) Prior Publication Data

US 2023/0161286 A1 May 25, 2023

(30) Foreign Application Priority Data

Nov. 22, 2021 (JP) ................................ 2021-189468

(51) Int. Cl.
*G03G 15/00* (2006.01)

(52) U.S. Cl.
CPC ..... *G03G 15/5062* (2013.01); *G03G 15/6529* (2013.01); *G03G 15/5029* (2013.01)

(58) Field of Classification Search
CPC .......... G03G 15/5029; G03G 15/6558; G03G 15/6529; G03G 15/5062
See application file for complete search history.

(56) References Cited

U.S. PATENT DOCUMENTS

2017/0219980 A1* 8/2017 Sato .................. G03G 15/5062
2019/0092592 A1* 3/2019 Suzuki ............... G03G 15/5029
2021/0223733 A1* 7/2021 Kobayashi ......... G03G 15/5029

FOREIGN PATENT DOCUMENTS

JP 2020-128269 A 8/2020

* cited by examiner

*Primary Examiner* — Sandra Brase
(74) *Attorney, Agent, or Firm* — RANKIN, HILL & CLARK LLP

(57) ABSTRACT

A recording material conveying device includes: a first conveyor that constitutes a conveyance path of a recording material; a second conveyor that branches from the first conveyor and constitutes a conveyance path of the recording material different from the conveyance path of the first conveyor; and a detector that detects recording material characteristics of the recording material, the detector being arranged in the second conveyor on a downstream side in a conveyance direction of the recording material with respect to a branch portion where the first conveyor and the second conveyor branch.

21 Claims, 4 Drawing Sheets

RECORDING MATERIAL CONVEYING DEVICE AND IMAGE FORMING SYSTEM

The entire disclosure of Japanese patent Application No. 2021-189468, filed on Nov. 22, 2021, is incorporated herein by reference in its entirety.

BACKGROUND

Technological Field

The present invention relates to a recording material conveying device and an image forming system including the recording material conveying device.

Description of the Related Art

In an image forming device, there is a case where a plurality of types of recording materials is used. In this case, the quality of a formed image can be improved by appropriately setting image forming conditions such as the transfer voltage and the fixing temperature of toner at the time of image formation according to the type and physical properties of the recording material. In addition, by conveying the recording material under more appropriate conveyance conditions according to the type and physical properties of the recording material, it is possible to suppress occurrence of conveyance failure of the recording material such as jam, image deviation, offset of the recording material, and the like.

As an image forming device that optimizes image forming conditions according to the type and physical properties of such a recording material, for example, a configuration has been proposed in which a detector for detecting characteristics such as the type and physical property values of the recording material (hereinafter, recording material characteristics) is arranged in a recording material conveyance path (see, for example, JP 2020-128269 A).

However, with the image forming device in which the detector is arranged in the above-described recording material conveyance path, when the recording material characteristics are detected, the conveyance of the recording material is stopped or the low-speed conveyance is performed so that the detection accuracy is enhanced and erroneous detection does not occur. For this reason, in an image forming job, it is necessary to perform the detection of the recording material characteristics before execution of image formation, and delay the start of the image formation during the period in which the recording material characteristics of the recording material are measured to make the recording material stand by. As a result, productivity decreases in the image forming device.

SUMMARY

In order to solve the above-described problem, the present invention provides a recording material conveying device and an image forming system capable of suppressing a decrease in productivity when characteristics of a recording material are sensed.

To achieve the abovementioned object, according to an aspect of the present invention, a recording material conveying device reflecting one aspect of the present invention comprises: a first conveyor that constitutes a conveyance path of a recording material; a second conveyor that branches from the first conveyor and constitutes a conveyance path of the recording material different from the conveyance path of the first conveyor; and a detector that detects recording material characteristics of the recording material, the detector being arranged in the second conveyor on a downstream side in a conveyance direction of the recording material with respect to a branch portion where the first conveyor and the second conveyor branch.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

<Embodiment of Recording Material Conveying Device and Image Forming System>

Figure 1:
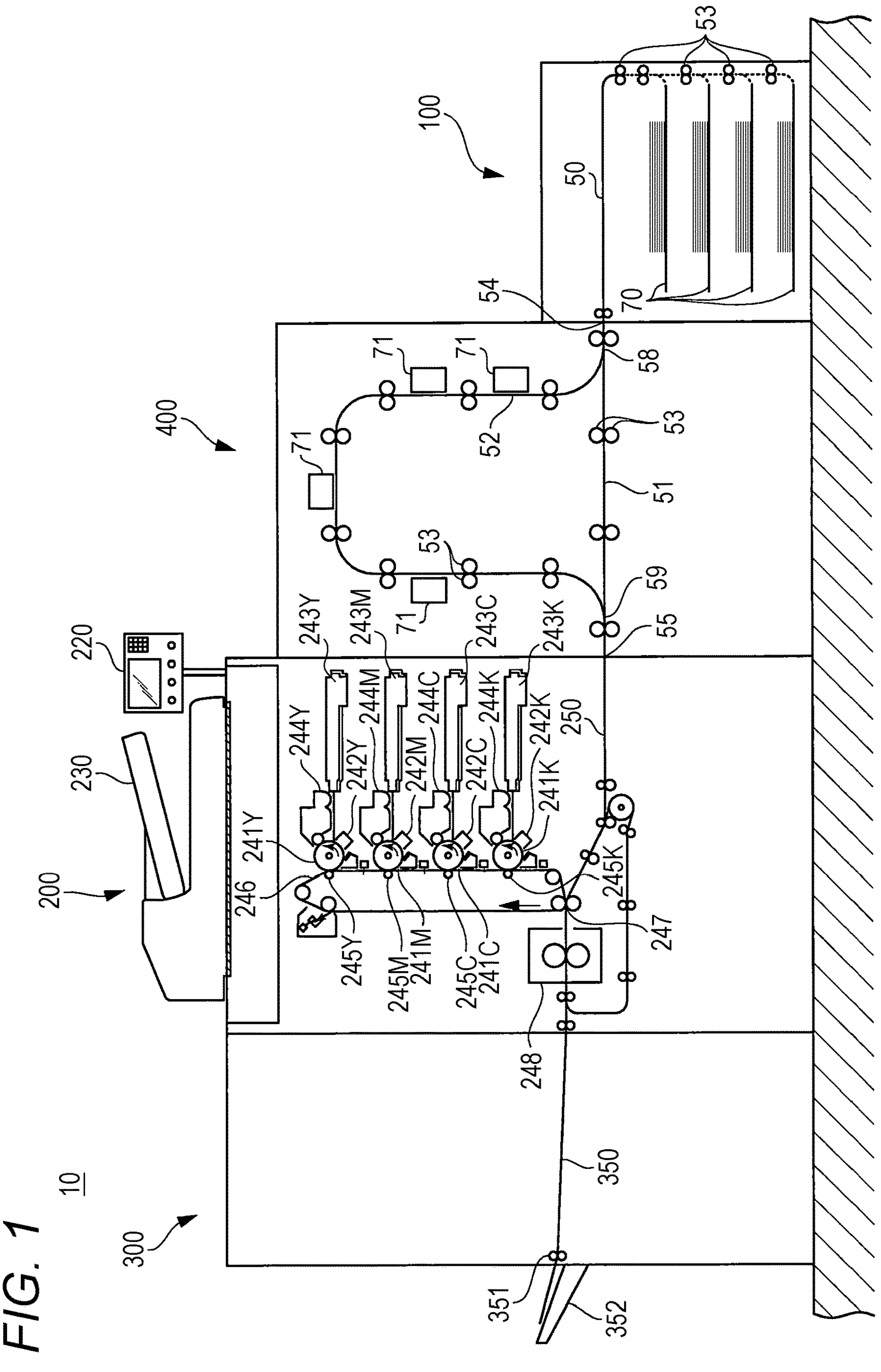
FIG. 1 is a diagram illustrating a schematic configuration diagram of an image forming system of a first embodiment.

FIG. 1 illustrates a schematic configuration diagram of an image forming system including a recording material conveying device of the present embodiment.

An image forming system 10 illustrated in FIG. 1 includes a recording material supply device 100, a recording material conveying device 400, an image forming device 200, and a post-processing device 300.

In the image forming system 10, a recording material S loaded in the recording material supply device 100 is supplied to the image forming device 200 via the recording material conveying device 400. Then, after an image is formed on the recording material S in the image forming device 200, the recording material S is carried out of the image forming device 200 to the post-processing device 300. Then, after predetermined post-processing is performed on the recording material S after the image forming processing in the post-processing device 300, the recording material S is discharged from the post-processing device 300.

[Recording Material Supply Device]

The recording material supply device 100 accommodates a recording material for image formation in the image forming system 10, and supplies the recording material S to the image forming device 200 according to an image forming job. As illustrated in FIG. 1, the recording material supply device 100 includes a conveyor 50, recording material supply units 70, which are recording material storage units, and the like.

The recording material supply unit 70 includes, for example, a plurality of sheet feeding trays arranged in the recording material supply device 100. On the recording material supply unit 70, a plurality of recording materials S can be loaded in a stacked state. FIG. 1 illustrates a configuration including four recording material supply units 70 arranged vertically. In each recording material supply unit 70, recording materials having different types and sizes are individually accommodated.

The conveyor 50 includes a taking-out roller (not illustrated) for taking out a recording material from each recording material supply unit 70, a plurality of conveying rollers 53 for conveying the recording material provided along a predetermined recording material conveyance path, and the like. Therefore, the conveyance paths of the conveyor 50 join to be one path from the plurality of recording material supply units 70, and the path is connected to the recording material conveying device 400. Thus, the conveyor 50 drives the conveying rollers 53 to convey the recording material S fed from the recording material supply unit 70 to the recording material conveying device 400.

[Recording Material Conveying Device] The recording material conveying device 400 includes a carry-in port 54 through which the recording material S is carried into the recording material conveying device 400, a first conveyor 51 and a second conveyor 52 that convey the recording material S, a carry-out port 55 that carries out the recording material S, and medium sensors 71 as detectors that detect characteristics of the recording material S.

The first conveyor 51 constitutes a conveyance path through which the recording material S carried in through the carry-in port 54 is carried out through the carry-out port 55. Then, the second conveyor 52 branches from the first conveyor 51 at a branch portion 58 on the downstream side of the carry-in port 54. Moreover, the second conveyor 52 joins the first conveyor 51 again at a joining portion 59 on the upstream side of the carry-out port 55.

The first conveyor 51 and the second conveyor 52 include a plurality of conveying rollers 53 and the like for conveying the recording material S provided along the first conveyor 51 and the second conveyor 52.

In the second conveyor 52, medium sensors 71 are arranged as detectors that detect recording material characteristics of the recording material S. A plurality of medium sensors 71 is provided on the second conveyor 52.

The second conveyor 52 branches from the first conveyor 51 on the upstream side of the most upstream medium sensor 71 arranged on the second conveyor 52.

The second conveyor 52 joins the first conveyor 51 again on the downstream side of the most downstream medium sensor 71 arranged on the second conveyor 52 to form one path. Then, on the downstream side of the joining position of the second conveyor 52, the first conveyor 51 is connected to the carry-out port 55 that discharges the recording material S from the recording material conveying device 400 to the image forming device 200.

The first conveyor 51 is configured such that a conveyance distance of the recording material S is shorter than that of the second conveyor 52. In particular, the first conveyor 51 is configured such that the conveyance distance of the recording material S from the branch portion 58 with respect to the second conveyor 52 to the joining portion 59 is shorter than that of the second conveyor 52. The first conveyor 51 is preferably configured to have the minimum length of the recording material conveyance distance between the carry-in port 54 and the carry-out port 55 of the recording material conveying device 400.

In addition, the second conveyor 52 is configured such that the conveyance distance of the recording material S is longer than that of the first conveyor 51. The second conveyor 52 is preferably configured such that the conveyance distance of the recording material S is equal to or longer than the length of the long side of the recording material S that can be accommodated in the recording material supply device 100 and conveyed in the recording material conveying device 400. For example, the second conveyor 52 is preferably configured to have a length equal to or longer than the long side of a standard maximum size except for a long sheet such as a roll sheet.

The recording material S the recording material characteristics of which are detected by the medium sensors 71 is conveyed to the second conveyor 52. The recording material characteristics of the recording material S conveyed to the second conveyor 52 are detected by the medium sensors 71 arranged in the path. In the second conveyor 52, the recording material characteristics are detected by the medium sensors 71 in a state where the conveyance of the recording material S is stopped or the recording material S is conveyed at a speed lower than a normal conveyance speed at the time of image formation.

On the other hand, the recording material S the recording material characteristics of which are not detected by the medium sensors 71 is conveyed to the first conveyor 51. In the first conveyor 51, the recording material S is conveyed at the normal conveyance speed at the time of image formation.

(Medium Sensor)

Figure 2:
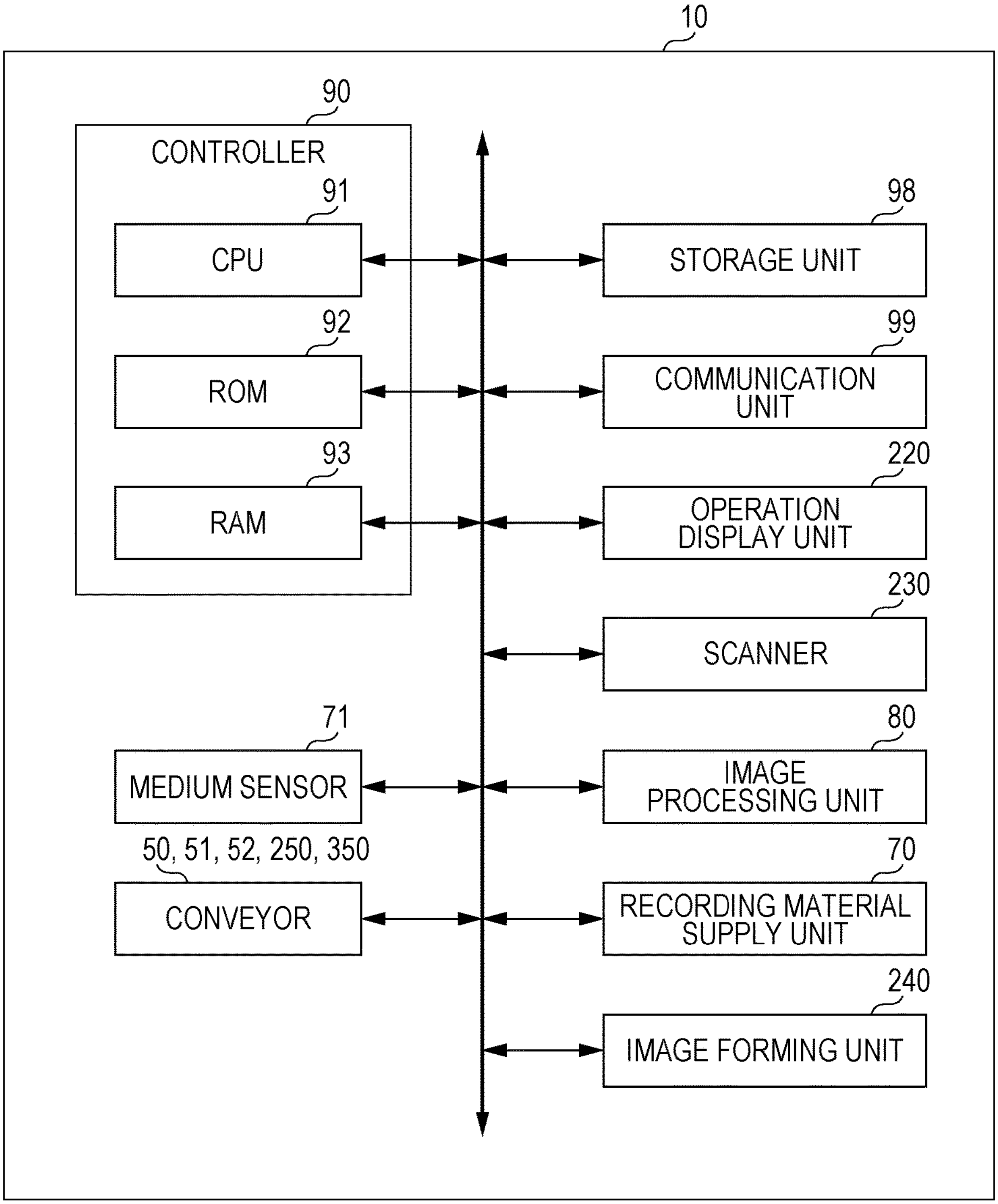
FIG. 2 is a system block diagram of the image forming system of the first embodiment.

The medium sensor 71 detects the recording material characteristics of the recording material S conveyed to the second conveyor 52 on the basis of the control of a controller 90 (FIG. 2). In the second conveyor 52, the medium sensors 71 that detect the recording material characteristics in a state where the conveyance of the recording material S is stopped or in a state where the conveyance speed is reduced such that the detection accuracy of the recording material characteristics can be improved are arranged.

The medium sensor 71 detects the type (for example, plain paper, high-quality paper, glossy paper, and the like) and the size of the recording material S, the physical properties of the recording material S, and the like. As the physical properties of the recording material S, for example, the thickness, the basis weight, the state of the surface such as smoothness, the rigidity, the charge amount, the water content, the paper grain (the angle of the fiber direction of the recording material), and the like are detected.

In addition, the medium sensor 71 includes various sensors for detecting the recording material characteristics. For example, the medium sensor 71 includes an imaging sensor for detecting the type of the recording material S. The imaging sensor includes a light source that irradiates the front surface of the recording material S with light, a light source that irradiates the back surface of the recording material S with light, and an imaging element that images the front surface of the recording material S. Then, an image in a reflection state at the time of front irradiation of the recording material S and an image in a transmission state at the time of back irradiation of the recording material S are acquired.

It is possible to identify the type of the recording material S from the features and characteristics of the acquired image.

In addition, the medium sensor 71 includes an optical sensor and a weight sensor for detecting the size, the weight, and the basis weight of the recording material S. The optical sensor includes a light receiving element that detects an end portion of the recording material S on an inspection table over which the conveyed recording material S passes. In addition, the weight sensor detects the weight of the recording material S in a unit area from a change in weight of the inspection table when the recording material S passes. Then, the size and area of the recording material S can be detected from the output of the optical sensor, and the basis weight can be acquired from the weight of the recording material S in a unit area detected by the weight sensor.

[Image Forming Device]

The image forming device 200 illustrated in FIG. 1 includes an operation display unit 220, a scanner 230, an image forming unit 240, a conveyor 250, and the like.

The operation display unit 220 includes an operation unit and a display unit.

The display unit includes, for example, a display device such as a liquid crystal display (LCD), and displays various screens in accordance with an instruction of a display signal input from the controller 90 (FIG. 2).

The operation unit includes a touch panel formed to cover a display screen of the display unit, and various operation buttons such as a numeric button and a start button, and outputs an operation signal based on a user's operation to the controller 90 to be described below. The operation unit receives an operation instruction from the user.

The scanner 230 optically scans a document conveyed onto contact glass from an auto document feeder (ADF) or a document placed on the contact glass, forms an image of reflected light of light illuminated and scanned from a light source to the document on a light receiving surface of a charge coupled device (CCD) sensor, reads a document image, and performs A/D conversion on the read image to generate image data.

The image forming unit 240 forms an image on the recording material S on the basis of the image data. The image forming unit 240 includes photoconductor drums 241Y, 241M, 241C, and 241K, charging units 242Y, 242M, 242C, and 242K, exposure units 243Y, 243M, 243C, and 243K, developing units 244Y, 244M, 244C, and 244K, primary transfer rollers 245Y, 245M, 245C, and 245K, which correspond to the respective colors of yellow (Y), magenta (M), cyan (C), and black (K). In addition, the image forming unit 240 includes an intermediate transfer belt 246, a secondary transfer roller 247, and a fixing unit 248.

The charging units 242Y, 242M, 242C, and 242K uniformly charge the photoconductor drums 241Y, 241M, 241C, and 241K.

The exposure units 243Y, 243M, 243C, and 243K include a laser light source, a polygon mirror, a lens, and the like, and scan and expose the surfaces of the photoconductor drums 241Y, 241M, 241C, and 241K with a laser beam on the basis of image data of each color to form electrostatic latent images.

The developing units 244Y, 244M, 244C, and 244K attach toners of the respective colors to the electrostatic latent images on the photoconductor drums 241Y, 241M, 241C, and 241K to perform development.

The primary transfer rollers 245Y, 245M, 245C, and 245K sequentially transfer the toner images of the respective colors formed on the photoconductor drums 241Y, 241M, 241C, and 241K onto the intermediate transfer belt 246 (primary transfer). That is, a color toner image in which the toner images of four colors are superimposed is formed on the intermediate transfer belt 246.

The secondary transfer roller 247 collectively transfers the color toner image on the intermediate transfer belt 246 onto one surface of the recording material S supplied from the supply tray (secondary transfer). The fixing unit 248 causes the recording material S to pass through a nip portion formed by a fixing roller and a pressure roller, thereby fixing the toner image on the recording material S by heating and pressurization.

The conveyor 250 includes a plurality of conveying rollers 53 and the like provided along a predetermined conveyance path for conveying the recording material S. The conveyor 250 drives the conveying rollers 53 to convey the recording material along the predetermined conveyance path in the image forming device 200. Then, the recording material S after the image formation is carried out to the post-processing device 300.

[Post-Processing Device]

The recording material S on which an image is formed in the image forming device 200 is carried into the post-processing device 300. The post-processing device 300 includes, for example, a plurality of post-processing units, and predetermined post-processing is performed in the post-processing unit designated by a job. For example, the post-processing device 300 includes a post-processing unit that performs processing such as perforation processing, folding processing, foil stamping processing, binding, cutting processing, stapling, gluing, and stitching.

In the post-processing device 300, the recording material S having been subjected to the image forming processing and conveyed from the image forming device 200 is conveyed to a post-processing unit, which is not illustrated, by a conveyor 350, and predetermined post-processing is performed on the recording material S. The conveyor 350 is conveyed by a conveying roller 351 or the like provided along the conveyance path, and is discharged to a discharge tray 352.

[System Block Diagram]

FIG. 2 illustrates a system block diagram of each device constituting the above-described image forming system illustrated in FIG. 1.

The controller 90 includes, for example, a central processing unit (CPU) 91, read only memory (ROM) 92, random access memory (RAM) 93, and the like. The CPU 91 reads various processing programs stored in the ROM 92, loads the programs onto the RAM 93, and centrally controls the operation of each unit of the image forming system 10 according to the loaded programs.

The ROM 92 stores various processing programs for controlling each unit of the image forming system 10, parameters and table data necessary for executing the programs, various files, and the like.

The RAM 93 includes volatile semiconductor memory, and forms a work area for temporarily storing various processing programs, input or output data, parameters, and the like read from the ROM 92 in various processing executed and controlled by the CPU 91.

A storage unit 98 stores, for example, image data received from an external device. In addition, the storage unit 98 stores various processing programs executed by the CPU 91, information regarding a processing function of the own device necessary for executing the programs, image data read by the scanner 230, image data input from a client device, which is not illustrated, a characteristic value of the recording material S detected by the medium sensor 71, and the like. The storage unit 98 may include, for example, nonvolatile memory such as a hard disk drive (HDD), a solid state drive (SSD), or flash memory.

A communication unit 99 includes a network interface card (NIC), a modem, or the like, connects the recording material supply device 100, the recording material conveying device 400, the image forming device 200, and the post-processing device 300 to a communication network such as a local area network (LAN) or a wide area network (WAN), and transmits and receives various data to and from external information equipment (for example, a client device).

The operation display unit 220 includes a touch panel or the like provided with a pressure-sensitive or capacitive operation unit (touch sensor) in which transparent electrodes are arranged in a grid pattern on a display unit such as a liquid crystal display (LCD) or an organic electro luminescence (EL) display, and functions as the display unit and the operation unit. The display unit displays various operation screens in accordance with a display control signal input from the controller 90. The operation unit receives various input operations by the user and outputs an operation signal to the controller 90.

The scanner 230 optically scans a document placed on the contact glass, forms an image of reflected light from the document on the light receiving surface of the charge coupled device (CCD) sensor, and reads a document image. The image (analog image signal) read by the scanner 230 is subjected to predetermined image processing in an image processing unit 80.

The image processing unit 80 includes a circuit that performs analog-digital (A/D) conversion processing, a circuit that performs digital image processing, and the like. The image processing unit 80 generates digital image data by performing A/D conversion processing on an analog image signal from the scanner 230. In addition, the image processing unit 80 analyzes a print job acquired from external information equipment (for example, a client device), rasterizes each page of the document, and generates digital image data. Then, the image processing unit 80 performs image processing such as color conversion processing, correction processing (shading correction or the like) according to initial setting or user setting, and compression processing on the image data as necessary, and outputs the image data after the image processing to the image forming unit 240.

[Functional Configuration of Controller]

Figure 3:
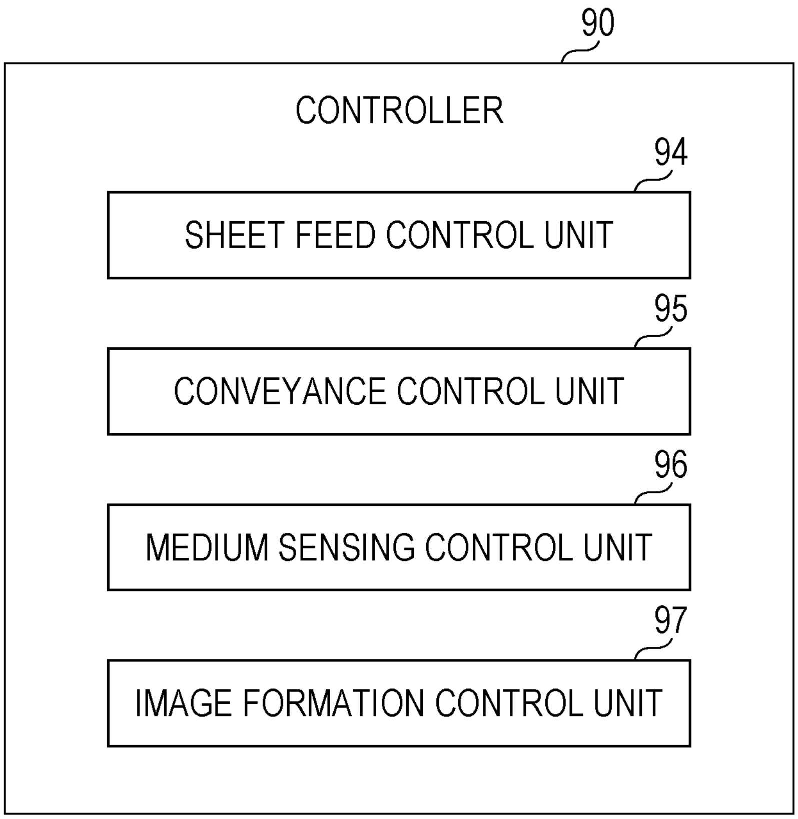
FIG. 3 is a functional block diagram of a controller of the image forming system of the first embodiment.

Next, a functional configuration of the controller 90 will be described. FIG. 3 is a functional block diagram of the controller 90. As illustrated in FIG. 3, the controller 90 includes a sheet feed control unit 94, a conveyance control unit 95, a medium sensing control unit 96, and an image formation control unit 97.

The sheet feed control unit 94 controls the supply of the recording material S from the recording material supply unit 70 to the conveyor 50 in the recording material supply device 100. The sheet feed control unit 94 supplies the recording material S to the conveyor 50 in accordance with the conveyance control of the recording material S by the conveyance control unit 95.

The conveyance control unit 95 controls the operation of the conveyance mechanism for the recording material S between the devices and in the device in the recording material supply device 100, the recording material conveying device 400, the image forming device 200, and the post-processing device 300 constituting the image forming system 10. Specifically, the conveyance control unit 95 controls driving of the conveyor 50 of the recording material supply device 100, the first conveyor 51 and the second conveyor 52 of the recording material conveying device 400, the conveyor 250 of the image forming device 200, and the conveyor 350 of the post-processing device 300. The conveyance control unit 95 controls the conveyance of the recording material S by interlocking the drive units between the respective devices by controlling the stop of the driving of each drive unit, the adjustment of the drive start timing and the drive speed, and the like according to the conveyance conditions in accordance with the recording material characteristics of the recording material S.

The conveyance control unit 95 sets the conveyance conditions of the recording material S according to the recording material characteristics acquired by the medium sensing control unit 96. For example, the conveyance control unit 95 acquires conveyance conditions according to the recording material characteristics from data stored in the storage unit 98 or the like. Then, the conveyance control unit 95 sets conveyance conditions of each configuration of the conveyor 50, the first conveyor 51, the second conveyor 52, the conveyor 250, and the conveyor 350 on the basis of the data acquired from the storage unit 98 or the like.

In addition, the conveyance control unit 95 selects the conveyance path of the recording material S from one of the first conveyor 51 and the second conveyor 52 in the recording material conveying device 400, and switches the conveyance path of the recording material S at the branch portion 58. Then, the driving of the first conveyor 51 or the second conveyor 52 selected as the conveyance path is controlled to convey the recording material S. The conveyance control unit 95 conveys at least one recording material S to the second conveyor 52 when conveying the plurality of recording materials S in a print job.

In the first conveyor 51, the conveyance control unit 95 drives the conveyance speed of the recording material S at a normal speed at the time of image formation. Then, the conveyance control unit 95 conveys the recording material S from the recording material conveying device 400 to the image forming device 200 by conveying the recording material S with the first conveyor 51.

In addition, in the second conveyor 52, the conveyance control unit 95 reduces the conveyance speed after the entire recording material S is conveyed to the second conveyor 52, that is, after the rear end of the recording material S passes through the branch portion 58. Then, after the recording material S reaches the medium sensor 71 that detects the recording material characteristics, the recording material S is conveyed while being lowered to a speed at which highly accurate detection can be performed by the medium sensor 71. In addition, the conveyance control unit 95 may stop the conveyance of the recording material S until the detection of the recording material characteristics by the medium sensor 71 ends after the recording material S is conveyed to the position where the recording material characteristics can be detected by the medium sensor 71.

Moreover, the conveyance control unit 95 conveys the recording material S the recording material characteristics of which have been detected in the second conveyor 52, and conveys the recording material S from the second conveyor 52 to the first conveyor 51 at the joining portion 59. The conveyance control unit 95 conveys the recording material S conveyed to the first conveyor 51 from the recording material conveying device 400 to the image forming device 200.

The medium sensing control unit 96 controls detection of recording material characteristics of the recording material S by the medium sensor 71. For example, when the recording material S is conveyed to the conveyance path on which the medium sensor 71 is provided, the medium sensing control unit 96 instructs the medium sensor 71 to execute the detection of the recording material characteristics. Based on this instruction, the medium sensor 71 starts detecting the recording material characteristics of the recording material S.

In addition, the medium sensing control unit 96 receives various data detected by each sensor of the medium sensor

71, and calculates the recording material characteristics of the recording material S on the basis of these pieces of data. For example, with the configuration in which the image forming system 10 includes the plurality of medium sensors 71, the medium sensing control unit 96 combines the data acquired from the plurality of medium sensors 71 and calculates the recording material characteristics of the recording material S.

The image formation control unit 97 controls an image forming operation in the image forming unit 240 of the image forming device 200. In addition, the image formation control unit 97 sets image forming conditions according to the recording material characteristics acquired by the medium sensing control unit 96. For example, the image formation control unit 97 acquires image forming conditions according to the recording material characteristics from data stored in the storage unit 98 or the like. Then, the image formation control unit 97 sets operation conditions for each configuration of the image forming unit 240 on the basis of data acquired from the storage unit 98 or the like. Then, the operation of each configuration of the image forming unit 240 is controlled according to the set operation conditions, and an image is formed on the recording material S on the basis of the image data.

[Detection of Recording Material Characteristics]

Figure 4:
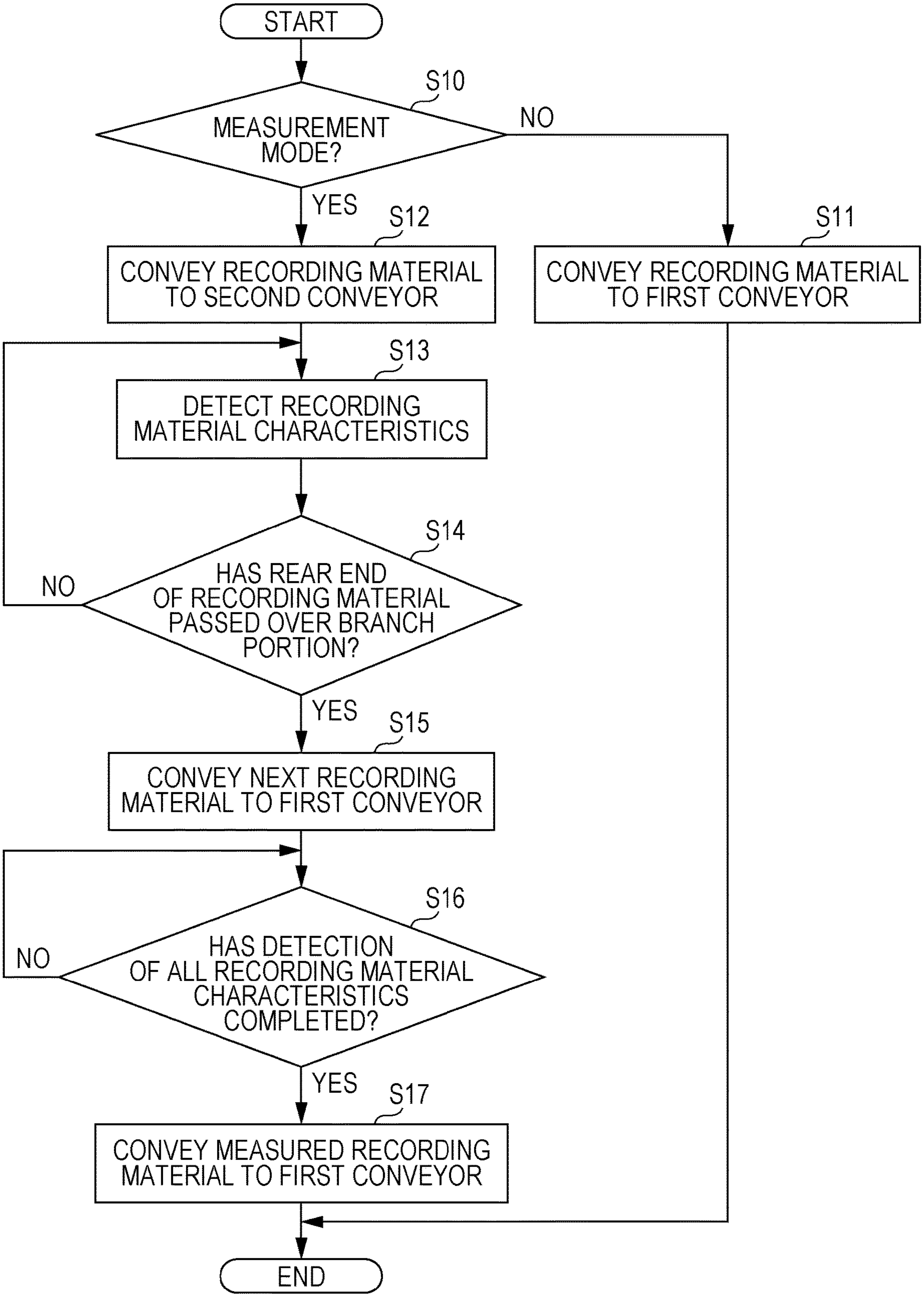
FIG. 4 is a flowchart of a method for detecting recording material characteristics in the image forming system of the first embodiment.

Next, a method of detecting the recording material characteristics in the image forming system 10 will be described. FIG. 4 is a flowchart of a method of detecting recording material characteristics. Note that, in the flowchart illustrated in FIG. 4, conveyance of the recording material in the recording material conveying device 400 and detection of recording material characteristics will be mainly described.

First, in the image forming system 10, the controller 90 determines whether a measurement mode for measuring recording material characteristics of the recording material S is set according to an instruction of a user or the like (step S10).

When the measurement mode is not set (No in step S10), the conveyance control unit 95 causes the recording material S (first sheet or first recording material S) conveyed from the recording material supply device 100 to the first conveyor 51 of the recording material conveying device 400 to pass through the branch portion 58 as it is and continues conveyance in the first conveyor 51 (step S11).

When the measurement mode is set (Yes in step S10), the conveyance control unit 95 conveys the first recording material S conveyed from the recording material supply device 100 to the first conveyor 51 of the recording material conveying device 400 to the second conveyor 52 by switching the conveyance path at the branch portion 58 (step S12).

Next, the medium sensing control unit 96 activates the medium sensor 71 and detects the recording material characteristics of the first recording material S conveyed to the second conveyor 52 (step S13). At this time, the conveyance control unit 95 stops the conveyance of the first recording material S in the second conveyor 52, or conveys the first recording material S at a speed lower than the normal conveyance speed at the time of image formation. The medium sensing control unit 96 detects recording material characteristics using the medium sensor 71 with respect to the first recording material S that is stopped or conveyed at a low speed.

Next, the conveyance control unit 95 determines whether the rear end portion of the first recording material S has passed through the branch portion 58 (step S14). The passage of the first recording material S through the branch portion 58 is determined from, for example, the sensing of the rear end portion of the first recording material S by the medium sensor 71 arranged on the most upstream side of the second conveyor 52, the conveyance speed and the conveyance time of the first recording material S after being carried into the recording material conveying device 400, and the like.

In a case where the rear end portion of the first recording material S has not passed through the branch portion 58 (No in step S14), the processing of step S13 is continued until the rear end portion of the first recording material S passes through the branch portion 58.

When the rear end portion of the first recording material S has passed through the branch portion 58 (Yes in step S14), the conveyance control unit 95 conveys a next recording material S (second sheet or second recording material S) conveyed from the recording material supply device 100 to the recording material conveying device 400 to the first conveyor 51 (step S15). Here, the conveyance control unit 95 continues the conveyance of the second recording material S on the first conveyor 51 side without conveying to the second conveyor 52 side at the branch portion 58. Then, it is preferable that the second recording material S be conveyed by the first conveyor 51 to a position where the second recording material S is carried in from the recording material conveying device 400 to the image forming device 200 by being conveyed in the first conveyor 51. In addition, in the image forming device 200, the conveyed second recording material S is preferably conveyed to a position before the image forming position of the image forming unit 240 by the conveyor 250 of the image forming device 200. For example, the second recording material S is conveyed to a registration roller immediately before the secondary transfer roller 247 of the image forming unit 240.

Next, the conveyance control unit 95 determines whether detection of all recording material characteristics of the first recording material S has been completed (step S16). When the detection of all the recording material characteristics has not been completed (No in step S16), the conveyance control unit 95 continues the processing of detecting the recording material characteristics of the first recording material S.

When the detection of all the recording material characteristics of the first recording material S is completed (Yes in step S16), the conveyance control unit 95 conveys the first recording material S the recording material characteristics of which have been detected from the second conveyor 52 to the first conveyor 51 (step S17). In the conveyance of the first recording material S here, the first recording material S is conveyed from the joining portion 59 to the first conveyor 51 by conveying the first recording material S to the downstream side of the second conveyor 52. In addition, the first recording material S the recording material characteristics of which have been detected joins the rear side (upstream side in the conveyance direction) of the second recording material S conveyed to the first conveyor 51 in step S15 described above in the first conveyor 51. Note that the joining position of the first recording material S is not necessarily limited to the position immediately after the second recording material S, and can be changed according to the number of recording materials S that can stay up to the position of the registration roller and the conveyance interval of the recording materials S. In a case where there is no margin in the conveyance interval of the recording materials S, the first recording material S can be joined as the recording material S on which the image is formed last in the job.

After the first recording material S is conveyed from the second conveyor 52 to the first conveyor 51, the processing according to the present flowchart ends.

After this processing, the recording materials S (first recording material S and second recording material S) conveyed by the first conveyor 51 in the image forming system 10 are conveyed from the recording material conveying device 400 to the registration roller of the image forming device 200. In the image forming device 200 to which the recording material S has been conveyed, image forming conditions corresponding to the detected recording material characteristics are set by the image formation control unit 97, and image formation is executed in the image forming unit 240.

In the processing according to the above-described flowchart, the recording material S (first sheet or first recording material S) first conveyed to the recording material conveying device 400 is conveyed to the second conveyor 52, and the recording material characteristics are detected in a state where the recording material S is stopped or conveyed at a low speed. Then, in a period in which the recording material characteristics of the first recording material S are detected, a subsequent recording material S, which is a next recording material S (second sheet or second recording material S), is conveyed from the recording material conveying device 400 to the image forming device 200 by the first conveyor 51.

In this manner, by providing the second conveyor 52 and arranging the medium sensors 71 on the second conveyor 52, the next, second recording material S can be conveyed to the image forming device 200 by the first conveyor 51 during the detection of the recording material characteristics of the first recording material S conveyed to the second conveyor 52. Therefore, after the detection of the recording material characteristics of the first recording material S is completed in the second conveyor 52, before the first recording material S is conveyed from the second conveyor 52 to the image forming device 200, image formation can be executed on a condition that the recording material characteristics are reflected on the second recording material S conveyed to the image forming device 200 in advance.

Accordingly, it is possible to suppress a loss of time generated when the recording material characteristics are detected, and it is possible to improve the image forming accuracy by detecting the recording material characteristics and to suppress a decrease in image forming productivity.

Although embodiments of the present invention have been described and illustrated in detail, the disclosed embodiments are made for purposes of illustration and example only and not limitation. The scope of the present invention should be interpreted by terms of the appended claims, and various modifications and changes can be made without departing from the configuration of the present invention.

What is claimed is:

1. A recording material conveying device comprising:

a first conveyor that constitutes a conveyance path of a recording material;

a second conveyor that branches from the first conveyor and constitutes a conveyance path of the recording material different from the conveyance path of the first conveyor; and a detector that detects a value corresponding to recording material characteristics of the recording material, the detector being arranged in the second conveyor on a downstream side in a conveyance direction of the recording material with respect to a branch portion where the first conveyor and the second conveyor branch.

2. The recording material conveying device according to claim 1, wherein the second conveyor joins the first conveyor again after branching.

3. The recording material conveying device according to claim 2, wherein the recording material is conveyed to an image forming device after the second conveyor joins the first conveyor again.

4. The recording material conveying device according to claim 1, wherein in a job of conveying a plurality of recording materials, the detector detects the value corresponding to the recording material characteristics with respect to some of the plurality of recording materials in the second conveyor.

5. The recording material conveying device according to claim 4, comprising:

a hardware processor that controls conveyance of the recording material in the first conveyor and the second conveyor; wherein the hardware processor conveys a second recording material in the first conveyor while the detector detects the value corresponding to the recording material characteristics of a first recording material in the second conveyor.

6. The recording material conveying device according to claim 1, wherein the hardware processor stops conveyance of the recording material or reduces a conveyance speed during a period in which the value corresponding to the recording material characteristics are detected by the detector.

7. The recording material conveying device according to claim 1, wherein the second conveyor has a longer conveyance distance of the recording material than the first conveyor.

8. The recording material conveying device according to claim 1, wherein a conveyance distance of the recording material of the second conveyor is longer than or equal to a long side of a standard maximum size that can be conveyed.

9. The recording material conveying device according to claim 1, wherein the recording material characteristics include at least one selected from a group consisting of a thickness, a basis weight, a smoothness, a rigidity, a charge amount, a water content and a paper grain of the recording material.

10. The recording material conveying device according to claim 1, wherein the detector includes a plurality of sensors arranged in the conveyance path of the second conveyor.

11. The recording material conveying device according to claim 10, wherein the recording material joins the first conveyor after completing a detection of the value corresponding to the recording material characteristics by the plurality of sensors.

12. The recording material conveying device according to claim 1, wherein the detector is arranged on a linear conveyance path included in the conveyance path of the second conveyor.

13. The recording material conveying device according to claim 1, further comprising:

a hardware processor that controls a conveyance of the recording material in the first conveyor and the second conveyor, wherein the hardware processor reduces a conveyance speed after a rear end of the recording material passes through the branch portion.

14. An image forming system with an image forming device and a recording material conveying device, the recording material conveying device comprising:

a first conveyor that constitutes a conveyance path of a recording material;

a second conveyor that branches from the first conveyor and constitutes a conveyance path of the recording material different from the conveyance path of the first conveyor; and a detector that detects a value corresponding to recording material characteristics of the recording material, the detector being arranged in the second conveyor on a downstream side in a conveyance direction of the recording material with respect to a branch portion where the first conveyor and the second conveyor branch.

15. The image forming system according to claim 14, wherein the recording material conveying device is arranged on at least one of an upstream side and a downstream side of the image forming device in a conveyance direction of the recording material.

16. The image forming system according to claim 14, further comprising:

a hardware processor that sets at least either one of an image forming condition or a conveyance condition of the recording material according to a detection result of the detector.

17. The image forming system according to claim 14, wherein in a job of conveying a plurality of recording materials, the detector detects the value corresponding to the recording material characteristics with respect to some of the plurality of recording materials in the second conveyor.

18. The image forming system according to claim 17, further comprising:

a hardware processor that controls a conveyance of the recording material, wherein the hardware processor controls the conveyance of the recording material such that, in a period in which the value corresponding to the recording material characteristics of a first recording material is detected by the detector, a second recording material conveyed next to the first recording material is conveyed from the recording material conveying device to the image forming device via the first conveyor.

19. The image forming system according to claim 14, wherein the recording material conveying device is arranged between a recording material supply device and the image forming device.

20. The image forming system according to claim 19, wherein the recording material supply device comprises a plurality of sheet feeding trays that accommodate the recording material.

21. The image forming system according to claim 14, wherein the recording material is conveyed to the image forming device after the recording material conveyed by the second conveyor passes a joining portion at which the second conveyor joins the first conveyor.

* * * * *